United States Patent [19]

Yamakawa

[11] Patent Number: 5,731,682
[45] Date of Patent: Mar. 24, 1998

[54] CONTROL UNIT AND CONTROL METHOD FOR MOTORS

[75] Inventor: Takayuki Yamakawa, Fukuoka, Japan

[73] Assignee: Kabushiki Kaisha Yaskawa Denki, Fukuoka, Japan

[21] Appl. No.: 505,202

[22] PCT Filed: Dec. 9, 1994

[86] PCT No.: PCT/JP94/02078

§ 371 Date: May 10, 1996

§ 102(e) Date: May 10, 1996

[87] PCT Pub. No.: WO95/19065

PCT Pub. Date: Jul. 13, 1995

[30] Foreign Application Priority Data

Jan. 6, 1994 [JP] Japan .................. 6-012084

[51] Int. Cl.⁶ .................................. H02P 05/40
[52] U.S. Cl. .................... 318/805; 318/812; 318/438; 318/808; 318/729
[58] Field of Search .................... 318/812, 810, 318/807, 808, 805, 804, 802, 800, 806, 801, 729, 438

[56] References Cited

U.S. PATENT DOCUMENTS

| | | | |
|---|---|---|---|
| 5,272,429 | 12/1993 | Lipo et al. | 318/8 |
| 5,420,778 | 5/1995 | Yoshino | 318/812 |
| 5,500,581 | 3/1996 | Hatanaka et al. | 318/807 |
| 5,521,482 | 5/1996 | Lang et al. | 318/800 |

*Primary Examiner*—John W. Cabeca
*Attorney, Agent, or Firm*—Morrison Law Firm

[57] ABSTRACT

A control unit for a motor and a control method for it, which are adapted for conducting control at a high speed so that efficiency of the motor by inverter operation of an induction motor is maximum at all times. This unit comprises means (3) for detecting effective power delivered to a motor (14), calculation means (1, 2, 4, 5, 6, 7, 8 16, $S_1$, $S_2$, $S_3$) for calculating, from the detected effective power and frequency (f) of an A.C. voltage delivered to motor (14), supply voltage ($V_1$) to motor (14) where efficiency of motor (14) becomes maximum, and means (9, 10, 11, 12) for delivering the calculated supply voltage ($V_1$) to motor (14).

3 Claims, 3 Drawing Sheets

CONTROL UNIT AND CONTROL METHOD FOR MOTORS

TECHNICAL SCOPE

This invention relates to a control unit for motors and a control method which are suitable for use in which induction motors (hereafter referred to as "motor") are operated at the maximum efficiency at all times irrespective of load fluctuations (variations).

BACKGROUND

Operation of a motor by inverter is ordinarily carried out under the condition where V (voltage)/f (frequency) is fixed. If operation frequency is determined, the motor experiences slip where the efficiency is maximum. This value takes a fixed value irrespective of whether load is high or low (light or heavy). In the operation where V/f is fixed, if frequency (f) is determined, since voltage (V) is fixed, slip changes when load changes. Accordingly, the efficiency changes, thus failing to achieve out operation at the maximum efficiency at all times. Explanation will now be briefly given by taking examples of conventional technology of this kind.

As a method for overcoming lowering of efficiency resulting from change of load which has been proposed as the first conventional example, there is an operation method disclosed in the Tokkohei No. 3-41029 (Japanese Patent Publication No. 41029/1991). This operation method is directed to an operation method for induction motors driven by voltage type inverters, wherein for a time period during which the induction motor is accelerated or decelerated, inverter output voltage is regulated so as to carry out operation by V/f constant control to conduct a control so that ratio V/f between a set inverter output voltage and an inverter output frequency is constant (fixed). In this way, when the induction motor is brought into the mode of constant operation, the method comprises the steps of determining output power $P_N$ by performing multiplication of inverter output voltage $E_{DCN}$ and inverter output current $i_{DCN}$. Decreasing the inverter output voltage from output voltage $V_0$ at the time of beginning of the constant operation to voltage $V_1$ dropped (lowered) by $\Delta V$, comparing difference $\Delta P1$ between the inverter output power $P_1$ calculated at this time and the inverter output power $P_0$ at the time of beginning of the constant operation with constant $\Delta P_s$ set in advance, it fixes the inverter output voltage to voltage $V_1$ if $\Delta P_1 < \Delta P_s$. On the other hand, further decreasing, the inverter output voltage has elapsed by $\Delta V$ from voltage $V_1$ after a predetermined time if $\Delta P_1 \geq \Delta P_s$, a comparison can be made of an output power decrease value at that time and the constant $\Delta P_s$, and repeating fixing or further decreasing of the inverter output voltage in dependency upon magnitude of the comparison result to operate the induction motor by inverter output voltage.

Further, in the Tokkaihei No. 3-261394 (Japanese Patent Application Laid Open No. 261394/1991) which has been proposed as the second conventional example, there are disclosed a unit and a method adapted for setting, in accordance with load factors, power factors in which power becomes minimum to control voltage so that this power factor is provided. This unit comprises a means for detecting voltage delivered to windings of a motor, means for detecting a current flowing in the winding, power calculation (operation) means connected to the voltage detecting method and the current detecting method, and operative to calculate active (effective) power for at least one cycle from the product of the voltage and the current, and to calculate apparent power for at least one cycle from product of effective value of the voltage and effective value of the current. In addition, the method for setting optimum power factor command value of the motor; the comparison means for calculating measurement power factor from the active power and the apparent power to compare the measurement power factor and the set power factor to generate a power factor comparison signal; and voltage regulation method responsive to the power factor comparison signal to regulate voltage delivered to the windings of the motor, wherein the means regulates the voltage so as to allow the measurement power factor to become close to the optimum power factor. Further, the above-mentioned method is a control method comprising steps for performing the previously described respective means.

However, in the method of the first conventional example, there is the problem that since it takes considerable time until power arrives at the minimum point because the minimum operation state of power is searched while carrying out very small change of voltage, response with respect to load change is poor. Moreover, in the method of the second conventional example, there is included the problem that while operation can be performed so that power becomes minimum, since voltage at which power becomes minimum and voltage at which efficiency becomes maximum are generally different as indicated by FIG. 1 which will be described later, the operation at the voltage where power becomes minimum would be operation at a portion shifted from the maximum efficiency (slip).

This invention is a means which has been carried out in view of respective problems as described above, and is directed to a unit aiming at conducting control at a high speed so that efficiency of the motor is maximum at all times with respect to load changes, and a method for such control.

DISCLOSURE OF THE INVENTION

This invention is directed to a control unit for a motor which is adapted for controlling motor operation by an inverter. The unit comprises a means for detecting the effective power delivered to the motor, a calculation method for calculating supply voltage to the motor where the efficiency of the motor is maximum from the detected effective power and frequency of A.C. voltage delivered to the motor; and the means for delivering the calculated supply voltage to the motor.

Moreover, this invention is directed to a control unit for a motor, wherein the method calculates, as a supply voltage which provides the maximum efficiency, product of coefficient $K_1$ determined by calculation from constant and supply frequency of the motor and the square root of detected effective power of the motor.

Further, this invention is directed to a motor control unit, wherein the calculation means, as a supply voltage which provides the maximum efficiency, product of coefficient $K_2$ determined by calculation from a constant and a specific frequency of the motor and the square root of effective power of the motor, which is detected as $(f/f_0)^{1/3}$ where f is the supply frequency.

Furthermore, this invention is directed to a motor control unit, wherein the effective power detection method is operative so that in the case where change of effective power is first constant $\Delta P_1$. When change of detected power is $\Delta P_1$ or more, it detects effective power by using a power detection filter of a smaller time constant, while when change of power is less than $\Delta P_1$, it detects effective power by using a power detection filter of a larger time constant.

In addition, this invention is directed to a motor control unit, wherein the effective power detection means is operative so that in the case where a change of effective power is second constant $\Delta P_2$ ($\Delta P_2 < \Delta P_1$), when change of effective power is less than $\Delta P_2$, it is fixed, as a detection value of effective power, when change of effective power is equal to $\Delta P_2$, while change of effective power is continued to be less than $\Delta P_2$, it allows the fixed power to be detected effective power.

Further, this invention is directed to a motor control unit, wherein the above-mentioned coefficient $K_1$ is expressed as follows:

$$K_1 = [\{r_1{}^2(s(\eta_{max}))^2 + 2r_1r_2(r_1g_m+1) \times$$
$$s(\eta_{max}) + r_2{}^2(r_1{}^2b_m{}^2+1) + 2r_2{}^2(r_1g_m + $$
$$x_1b_m)\}/\{r_1(s(\eta_{max}))^2 + r_2(2r_1g_m+1) \times$$
$$s(\eta_{max}) + r_2{}^2(g_m + r_1b_m{}^2)\}]^{1/2}$$

where $r_1$, $r_2$, $L_1$, $r_m$, $L_m$ are the motor constants, and f indicates the supply voltage frequency for the motor, and then $r_1$ is motor primary resistance, $r_2$ is secondary resistance converted into the primary side of motor, $L_1$ is primary leakage inductance of motor, $x_1$ is primary leakage reactance of motor=$2 \times \pi \times L_1 \times f$, $r_m$ is iron loss resistance, $L_m$ is excitation inductance, $x_m$ is excitation reactance=$2 \times \pi \times L_m \times f$, $b_m$ is excitation susceptance of motor=$x_m/(r_m{}^2+x_m{}^2)$, $g_m$ is excitation conductance of the motor=$r_m/(r_m{}^2+x_m{}^2)$, $s(\eta_{max})$ is optimum slip of motor when supply voltage frequency is f for motor, and $s(\eta_{max})$ is given as follows $$=[-B+\{B \times (A+B+1)\}^{1/2}]/(A+1),$$

with $A=\{r_2(2r_1g_m+1)\}/r_1$
and $B=\{r_2{}^2(g_m+r_1b_m{}^2)\}/r_1$.

In addition, this invention is directed to a motor control method for controlling motor operation by an inverter, wherein during acceleration or deceleration, operation is performed by a control in which (supply voltage)/(frequency) is constant (fixed), and after output frequency reaches a command value, control of motor operation to provide the maximum efficiency is initiated.

Since this invention is directed to such motor control units and methods thereof, optimum voltage can be delivered to the motor depending on load conditions. Accordingly, it is possible to operate the motor at the maximum efficiency while always and quickly conforming to load conditions, etc.

BEST MODE FOR UTILIZING THIS INVENTION

This utilization will now be described with reference to the attached drawings.

Figure 1:
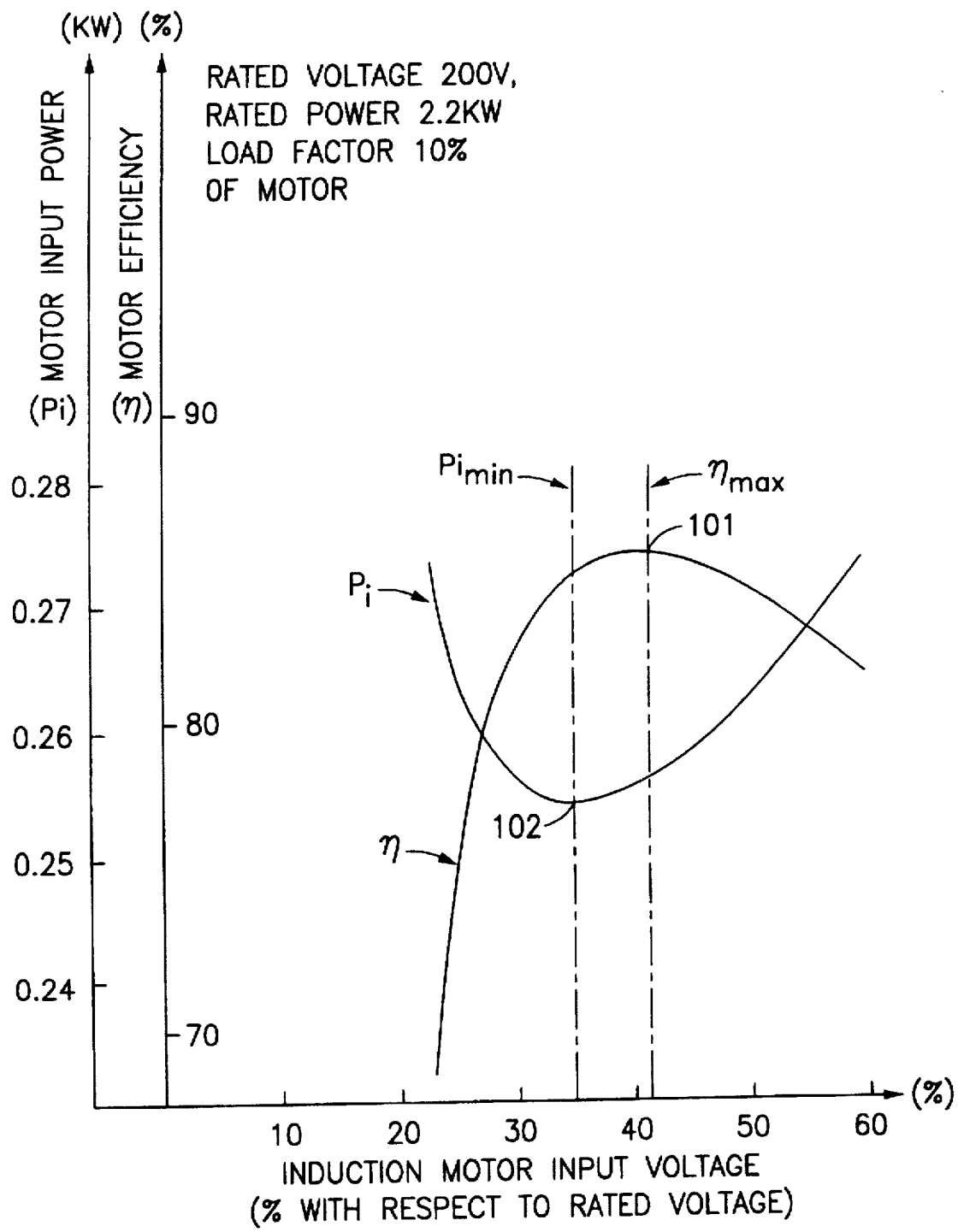
FIG. 1 is a view showing input power versus efficiency of the motor when input voltage of the motor is changed under the condition where motor load is fixed.

FIG. 1 is a view showing the relationship between input power and efficiency of the motor when input voltage of the motor is changed under the condition where load of the motor is fixed. This is a characteristic curve when input power (first ordinate) and efficiency (second ordinate), which correspond to input voltage (abscissa) at the rated voltage of 200 V and rated power of 2.2 KW and load factor 10% of the motor are plotted on the same plane, wherein point 102 where input power becomes minimum is an input voltage clearly different from point 101 where efficiency becomes maximum.

Figure 2:
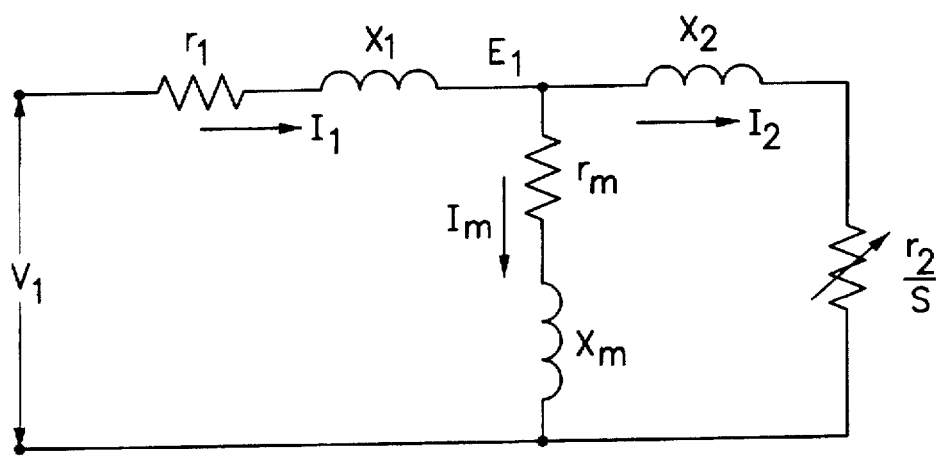
FIG. 2 is a T-type equivalent circuit diagram of the motor.

A T-type equivalent circuit of the motor of a utilization of this invention is shown in FIG. 2. In FIG. 2, $V_1$ denotes phase voltage; $r_1$ denotes primary resistance; $x_1$ denotes leakage reactance; $I_1$ denotes primary current; $E_1$ denotes primary voltage; $r_2$ denotes secondary resistance converted into the primary side; $x_2$ denotes secondary leakage reactance converted into the primary side; $I_2$ denotes secondary current converted into the primary side; s denotes slip; $r_m$ denotes iron loss resistance; $x_m$ denotes excitation reactance; and $I_M$ denotes excitation current. When $g_m$ is excitation conductance, $b_m$ is excitation susceptance and j is complex number symbol. The following equation derives from the above-mentioned equivalent circuit.

$$\text{Vector } I_M = (\text{vector } E_1)/(r_m + jx_m) \quad (1)$$
$$= (\text{vector } E_1) \times (g_m - jb_m)$$

In the above equation, $$g_m = r_m/(r_m{}^2+x_m{}^2) \quad (1a)$$
$$b_m = x_m/(r_m{}^2+x_m{}^2) \quad (1b)$$

$$\text{Vector } I_2 = (\text{vector } E_1)/\{(r_2/s)+jx_2\} \quad (2)$$
$$= (\text{vector } E_1) \times [\{sr_2/(r_2{}^2+s^2x_2{}^2)\} - $$
$$j\{s^2x_2/(r_2{}^2+s^2x_2{}^2)\}]$$
$$= (\text{vector } E_1) \times (a_1 - ja_2)$$

In the above equation, $$a_1 = sr_2/(r_2{}^2+s^2x_2{}^2) \quad (2a)$$
$$a_2 = s^2x_2/(r_2{}^2+s^2x_2{}^2) \quad (2b)$$

$$\text{Vector } I_1 = (\text{vector } I_M) + (\text{vector } I_2) \quad (3)$$
$$= (\text{vector } E_1) \times \{(a_1 + g_m) - j(a_2 + b_m)\}$$
$$= (\text{vector } E_1) \times \{(b_1 - jb_2)\}$$

In the above equation, $$b_1 = a_1 + g_m \quad (3a)$$
$$b_2 = a_2 + b_m \quad (3b)$$

$$\text{Vector } V_1 = (\text{vector } E_1) + (r_1 + jx_1) \times (\text{vector } I_1) \quad (4)$$
$$= (\text{vector } E_1) \times \{(1 + b_1r_1 + b_2x_1) - $$
$$j(b_2r_1 - b_1x_1)\}$$
$$= (\text{vector } E_1) \times (c_1 - jc_1)$$

In the above equation, $$c_1 = 1 + b_1r_1 + b_2x_1 \quad (4a)$$
$$c_2 = b_2r_1 - b_1x_1 \quad (4b)$$

From the equations (3), (4), $$\text{Vector } I_1 = \{(b_1 - jb_2)/(c_1 - jc_2)\}V_1 \tag{5}$$

Apparent power $P_{1e}$ delivered to the motor is expressed as follows.

$$\begin{aligned} P_{1e} &= 3 \times (\text{vector } V_1) \times (\text{conjugate vector of } I_1) \\ &= \{3(b_1 + jb_2)/(c_1 + jc_2)\}V_1^2 \\ &= \{3V_1^2/(c_1^2 + c_2^2)\} \times \{(b_1c_1 + b_2c_2) - j(b_1c_2 - b_2c_1)\} \end{aligned} \tag{6}$$

Since effective power $P_1$ of the primary input of the motor is given by the real part of the equation (6), $$P_1 = \{3(b_1c_1 + b_2c_2)/(c_1^2 + c_2^2)\}V_1^2 \tag{7}$$

Apparent power $P_{2e}$ of the secondary input of the motor is expressed as follows.

$$\begin{aligned} P_{2e} &= 3 \times (\text{vector } E_1) \times (\text{conjugate vector of } I_2) \\ &= 3 \times (\text{vector } E_1) \times (\text{conjugate vector of } E_1) \times (a_1 + ja_2 \times) \\ &= \{3V_1^2/(c_1^2 + c_2^2)\} \times (a_1 + ja_2) \end{aligned} \tag{8}$$

Since effective power P2 of the secondary input of the motor is given by the real part of the equation (8), $$P_2 = 3V_1^2 a_1/(c_1^2 + c_2^2) \tag{9}$$

Since mechanical output $P_{2m}$ is the value obtained by multiplying effective power $P_2$ of the secondary input by $(1-s)$, $$P_{2m} = \{3a_1(1-s)/(c_1^2 + c_2^2)\} \times V_1^2 \tag{10}$$

Efficiency $\eta$ of the motor is expressed as follows.

$$\eta = P_{2m}/P_1 = (1-s)a_1/(b_1c_1 + b_2c_2) \tag{11}$$

Since $a_1, b_1, b_2, c_1, c_2$ are parameters (variables) (varying) as a function of motor constant, frequency and slip s in the above equation, efficiency $\eta$ also becomes a parameter (variable) as a similar function.

Slip s which provides the maximum efficiency is obtained by determining slip s where the equation obtained by differentiating the equation (11) by s is equal to zero.

Assuming now that slip at this time is $s(\eta_{max})$, since slip $s(\eta_{max})$ which provides the maximum efficiency varies as a function of constant and frequency of the motor, the slip $s(\eta_{max})$ becomes equal to constant value irrespective of load.

On the other hand, effective power $P_1$ of the primary input of the motor is expressed as below from the equation (7):

$$P_1 = \{3(b_1c_1 + b_2c_2)/(c_1^2 + c_2^2)\} \times V_1^2$$

When line voltage $V_L$ is substituted for phase voltage of $V_1$, $$V_L = V_1/(3)^{1/2}$$

Subtitution of line voltage $V_L$ into the equation (7) gives:

$$P_1 = \{(b_1c_1 + b_2c_2)/(c_1^2 + c_2^2)\} \times V_L^2$$

When line voltage $V_L$ is determined from the above equation, $$\begin{aligned} V_L &= \{(c_1^2 + c_2^2)/(b_1c_1 + b_2c_2)\}^{1/2} \times P_1^{1/2} \\ &= K_1 P_1^{1/2} \end{aligned} \tag{12}$$

In the above equation, $$K_1 = \{(c_1^2 + c_2^2)/(b_1c_1 + b_2c_2)\}^{1/2} \tag{12a}$$

Since $b_1, b_2, c_1, c_2$ are are parameters varying as a function of motor constant, frequency, slips, and coefficient $K_1$ also become parameters varying as a similar function.

If load changes, slip s changes. Accordingly, coefficient $K_1$ also changes. However, when an approach is employed to control line voltage $V_L$ so that slip s becomes equal to slip $s(\eta_{max})$ which provides the maximum efficiency at all times irrespective of load change, value of coefficient $K_1$ also becomes equal to a fixed value irrespective of load changes. In other words, if the product of coefficient $K_1$ at the time of slip $s(\eta_{max})$ which provides the maximum efficiency and the square root of detected effective power $P_1$ of the primary input of the motor is given as input voltage of the motor, slip maintains $s(\eta_{max})$. Accordingly, it is possible to operate the motor at the maximum efficient at all times with respect to load changes.

However, since the equation obtained by differentiating the equation (11) by slip s is put so that it is equal to zero is equation of the sixth degree. Since this equation cannot be analytically solved, coefficient $K_1$ is determined by approximation as described below. When the equations (3a), (3b), (4a), (4b) are applied to the equation (11), efficiency $\eta$ is expressed as follows.

$$\begin{aligned} \eta &= \{(1-s)a_1\}/(g_m + g_m r_1 b_1 + g_m x_1 b_2 + \\ &\quad a_1 + r_1 a_1 b_1 + x_1 a_1 b_2 + r_1 b_m b_2 + \\ &\quad r_1 a_2 b_2 - x_1 b_m b_1 - x_1 a_2 b_1) \end{aligned} \tag{13}$$

Since, in the equation (13), $(g_m x_1 b_2)$, $(r_1 a_2 b_2)$, $(x_1 a_2 b_1)$ are small as compared to other terms and $(x_1 a_1 b_2) \approx (x_1 b_m b_1)$, they are disregarded. Thus, the equation (13) is expressed as follows.

$$\eta = \{(1-s)a_1\}/(g_m + a_1 + r_1 a_1 b_1 + r_1 b_m b_2 + g_m r_1 b_1) \tag{14}$$

Moreover, since $r_2^2 \gg s_2 x_2^2$ in the equations (2a), (2b), $s^2 x_2^2$ of respective denominator of the equations are disregard, the following equations are provided.

$$a_1 \approx s/r_2 \tag{14a}$$

$$a_2 \approx (x_2 s^2)/r_2^2 \tag{14b}$$

In addition, from the equations (3a), (3b), $$b_1 \approx g_m + s/r_2 \tag{14c}$$

$$b_2 \approx b_m + x_2(s^2/r_2^2) \tag{14d}$$

Subtitution of these equations into the equation (14) gives:

$$\eta = \{(1-s)sr_2\}/\{r_1 s^2 + r_2(2r_1 g_m + 1)s + r_2^2(g_m + r_1 b_m^2)\} \tag{15}$$

Substituting $d\eta/ds = 0$ to determine slip s. Thus, slip $s(\eta_{max})$ which provides the maximum efficiency is determined.

Substituting $$A = \{r_2(2r_1 g_m + 1)\}/r_1$$

$$B = \{r_2^2(g_m + r_1 b_m^2)\}/r_1$$

slip $s(\eta_{max})$ which provides the maximum efficiency is expressed as follows.

$$s(\eta_{max}) = \{-B + \{B \times (A+B+1)\}^{1/2}\}/(A+1) \quad (16)$$

Since A, B are parameters varying as a function of motor constant and frequency, $s(\eta_{max})$ which provides the maximum efficiency is also a parameter varying as a function of similar function.

When the equations (4a), (4b) are applied in the equation (12a), $$c_1^2 + c_2^2 = 1 + r_1^2 b_1^2 + x_1^2 b_2^2 + 2r_1 b_1 + 2x_1 b_2 + r_1^2 b_2^2 + x_1^2 b_1^2$$

Since $(r_1^2 b_2^2)$, $(x_1^2 b_2^2)$ are small to such a degree that they can be disregarded as compared to other terms, $$c_1^2 + c_2^2 \approx 1 + r_1^2 b_1^2 + 2r_1 b_1 + 2x_1 b_2 + x_1^2 b_1^2$$

When the equations (3a), (3b) are applied to the above equation, $$\begin{aligned} c_1^2 + c_2^2 &= r_1^2 g_m^2 + 2a_1 r_1^2 g_m + r_1^2 a_1^2 + \\ &\quad r_1^2 b_m^2 + 2r_1^2 a_2 b_m + r_1^2 a_2^2 + \\ &\quad 2r_1 g_m + 2r_1 a_1 + 2x_1 b_m + 2x_1 a_2 + 1 \end{aligned}$$

since $(r_1^2 g_m)$, $(2r_1^2 a_2 b_m)$, $(r_1^2 a_2^2)$, $(2x_1 a_2)$ are small as compred to other terms, they are disregarded. Thus, the following expression is obtained.

$$c_1^2 + c_2^2 \approx 2a_1 r_1^2 g_m + r_1^2 a_1^2 + r_1^2 b_m^2 + 2r_1 g_m + 2r_1 a_1 + 2x_1 b_m + 1$$

Substitution of $a_1 \approx \eta \, s/r_2$ of the equation (14a) and $a_2 \approx (x_2 s^2)/r_2^2$ of the equation (14b) into the above equation gives:

$$\begin{aligned} c_1^2 + c_2^2 &= (1/r_2^2) + (2r_1^2 g_m s + r_1^2 s^2 + \\ &\quad r_1^2 r_2^2 b_m^2 + 2r_1 r_2^2 g_m + 2r_1 r_2 s + \\ &\quad 2x_1 r_2^2 b_m + r_2^2) \end{aligned}$$

Similarly, $$b_1 c_1 + b_2 c_2 = (1/r_2^2) \times (r_2^2 g_m + 2r_1 r_2 g_m s + r_2 s + r_1 s^2 + r_1 r_2^2 b_m^2)$$

Substitution of these $(c_1^2 + c_2^2)$ and $(b_1 c_1 + b_2 c_2)$ into the equation (12a) is made, and coefficient $K_1$ when slip s is caused to be $s(\eta_{max})$, is expressed as follows.

$$K_1 = [\{r_1^2 (s_{(\eta_{max})})^2 + 2r_1 r_2 (r_1 g_m + 1) \times \quad (17)$$
$$s_{(\eta_{max})} + r_2^2 (r_1^2 b_m^2 + 1) + 2r_2^2 (r_1 g_m + x_1 b_m)\} / \{r_1 (s_{(\eta_{max})})^2 + r_2 (2r_1 g_m + 1) \times s_{(\eta_{max})} + r_2^2 (g_m + r_1 b_m^2)\}]^{1/2}$$

This equation (17) provides a good approximated value in a broad range of the motor capacity and the operation frequency.

When the product of coefficient $K_1$ calculated by the equation (17) and the square root of detected primary input power $P_1$ of the motor is given as an input voltage, it is possible to operate the motor at the maximum efficiency.

In order to operate the motor at the maximum efficiency, as previously described, there is required a calculation means for determining $s(\eta_{max})$ capable of operating the motor at the maximum efficiency by the equation (16) to apply such slip value to the equation (17) thus to determine value of coefficient $K_1$. If calculation is carried out by this procedure, it is possible to calculate, with good accuracy, voltage which provides the maximum efficiency, delivered to the motor. However, since the quantity of calculations is great, if attempt is made to realize high speed response, the unit becomes expensive.

Figure 3:
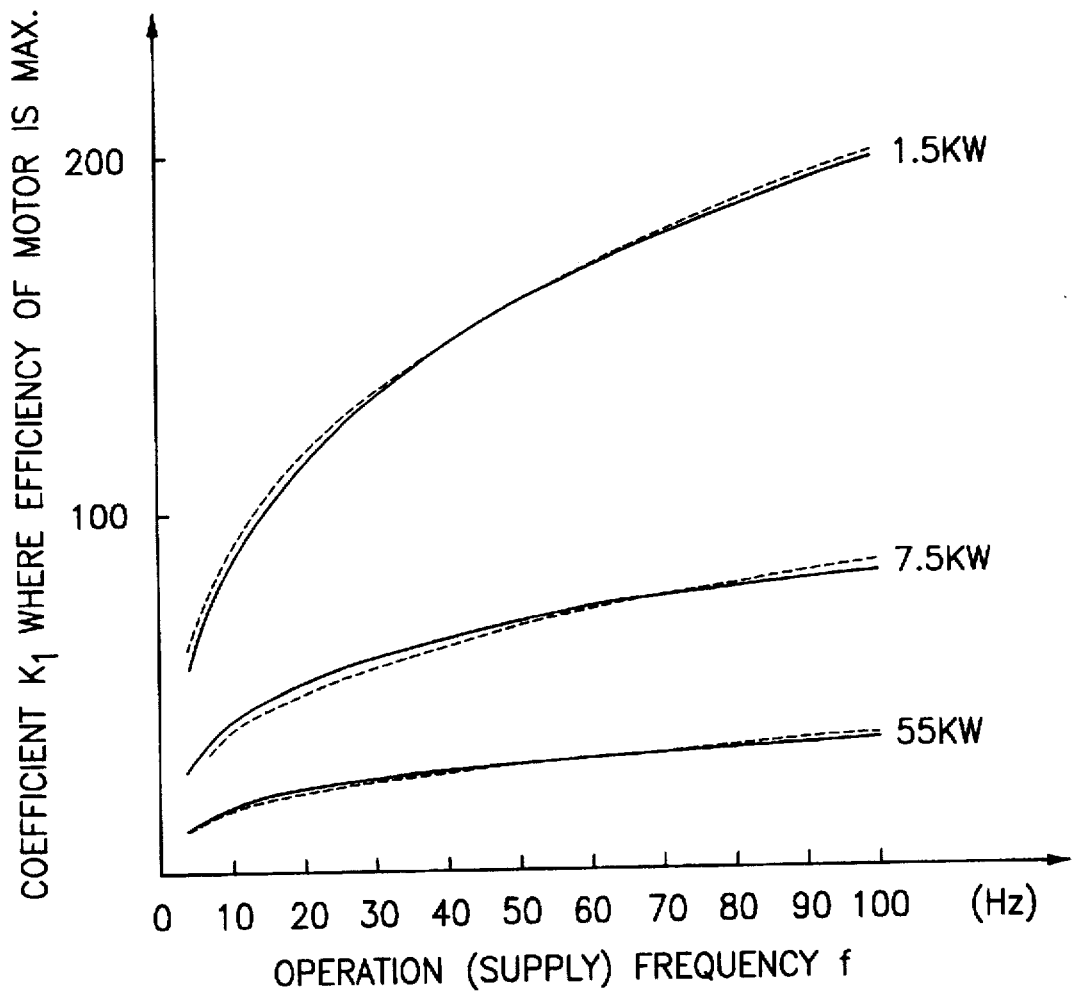
FIG. 3 is a view showing the case where the value of coefficient $K_1$ when frequency as contained in this invention is rigorously calculated and the case where that value is calculated so as to become proportional to the cube root of frequency.

In accordance with the numeric calculation, value of coefficient $K_1$ indicated by the equation (17) is substantially proportional to the cubic-root of frequency. When value of coefficient $K_1$ when frequency f is changed in the equation (17) is examined, result is as shown in FIG. 3. While three types of motors of 1.5 KW, 7.5 KW, and 55 KW are shown in the example of FIG. 3, motors of other capacities show a substantially similar tendency. Solid lines of FIG. 3 indicate results obtained by plotting values of coefficient $K_1$ at respective frequencies determined by using an approximate calculation method of Newton on the basis of the equation (11), and broken lines are the results obtained by determining values of coefficient $K_1$ at the time of 60 Hz by the approximate calculation method of Newton to allow this value to be coefficient $K_{60}$ to determine values of coefficient $K_{1f}$ at the operation frequency f by the following equation to plot them.

$$K_{1f} = \{K_{60}/(60)^{1/3}\}(f)^{1/3} \quad (18)$$
$$K_2(f)^{1/3}$$

In the above equation, $K_2 = K_{60}/(60)^{1/3}$

It is seen that the value coefficient $K_1$ is substantially proportional to the cubic square of frequency. It is not necessary that the fundamental frequency is 60 Hz. Generally, an approach may be employed in which the fundamental frequency is caused to be $f_0$ to determine, with good accuracy, value $K_{f0}$ of coefficient $K_1$ when the fundamental frequency is $f_0$ to determined the value of coefficient $K_{1f}$ at the operation frequency f on the basis-of value $K_{f0}$ as follows.

$$K_{1f} = \{K_{f0}/(f_0)^{1/3}\}(f)^{1/3} \quad (19)$$

When the value of coefficient $K_1$ when operation frequency is changed is determined by the equation (18) or (19), calculation time is shortened, thus making it possible to improve response.

When consideration is collectively made, line voltage $V_L$ of supply voltage to the motor which provides the maximum efficiency, $$V_L = K_1 \cdot (P_1)^{1/2} = K_{f0} \cdot (f/f_0)^{1/3} \cdot (P_1)^{1/2} \quad (20)$$

Supply voltage to the motor is calculated by the equation (20) by effective power of the motor and is delivered to the motor. However, if filter time constant for detection of power is small, there is a lack of stability lacks, while if such filter constant is prolonged, response becomes poor. To solve this problem, two time constants are used [of course three time constants or more may be used and fine control is conducted depending upon the circumstances] to use a filter of short time constant when change of power is great; to use a filter of long time constant when that change is small; and to fix detected power when change of power is even smaller to deliver a fixed voltage to the motor, thus to achieve more stabilization.

Figure 4:
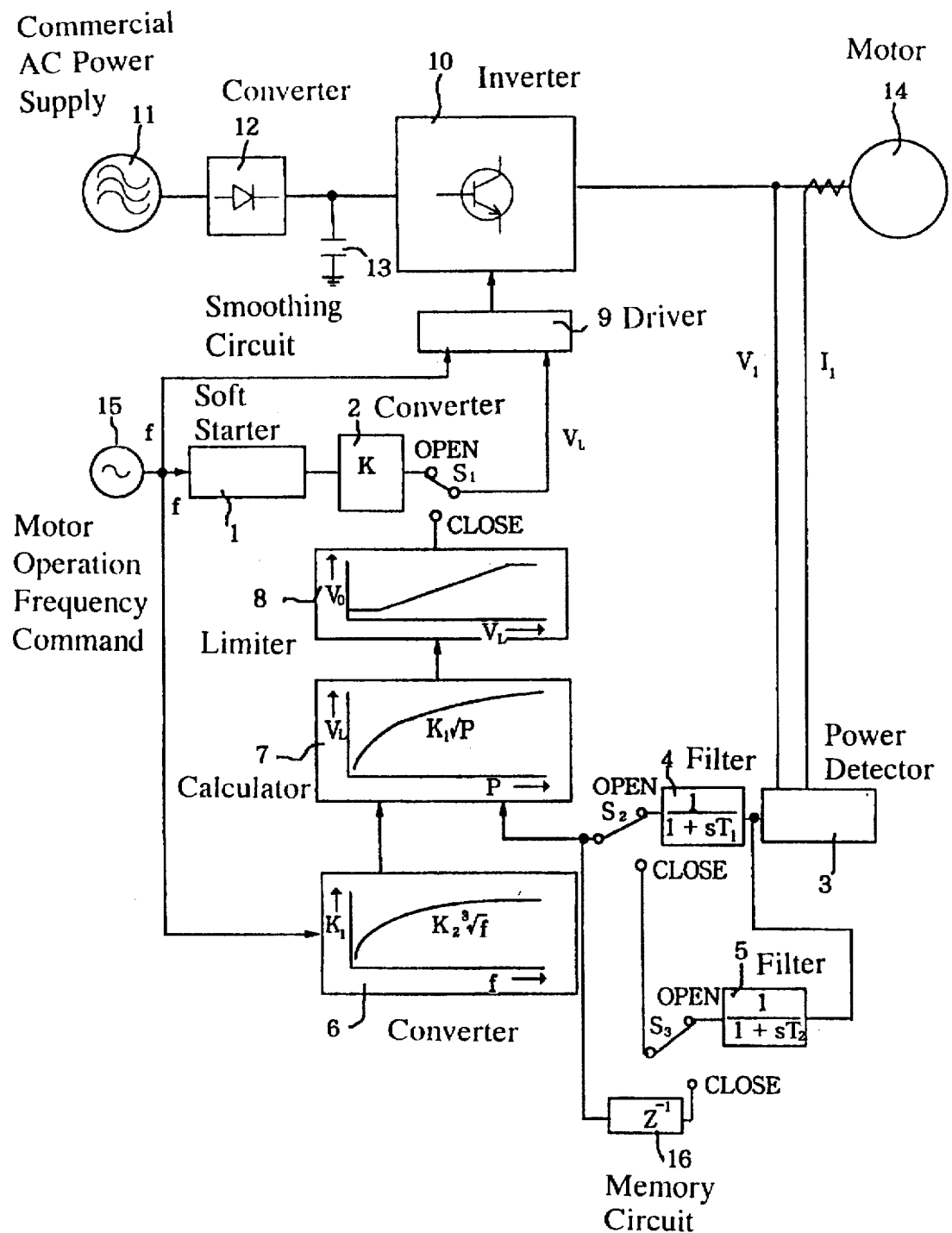
FIG. 4 is a block diagram showing a circuit configuration in the characteristics of this invention.

A block diagram of the circuit configuration contained in this invention is shown in FIG. 4, and the explanation will now be given.

In FIG. 4, reference number 1 is a soft starter for avoiding sudden rising (increase) of speed at the time of starting of the motor to gently start operation. Reference number 2 is frequency-to-voltage converter; reference number 3 is a power detector; reference number 4 denotes a filter of time constant $T_1$; reference number 5 is a filter of time constant $T_2$ $[T_1<T_2]$; reference number 6 is a frequency f-to-coefficient $K_1$ converter; reference number 7 is a calculator (operation element) for introducing detected power P and coefficient $K_1$ to multiply the square root of power P by coefficient $K_1$ to calculate line voltage (supply voltage) $V_L$; reference number 8 is a limiter in which line voltage $V_L$ is taken on the abscissa and command voltage $V_0$ is taken on the ordinate; reference number 9 is a driver; reference number 10 denotes an inverter; reference number 11 is a commercial A.C. power supply; reference number 12 is a converter; reference number 13 is a smoothing circuit; reference number 14 is a motor to be driven; reference number 15 is a motor operation frequency command element; reference number 16 is a memory circuit for storing detected power at the last sampling period in detection of power, and $S_1 \sim S_3$ are changeover (selector) switches.

It is now assumed that changeover switch $S_1$ is initially in "open" state. Operation frequency f from the frequency command element 15 is passed through soft starter 1, wherein it increases from frequency zero toward f by a set time gradient. The frequency-to-voltage converter 2 is a unit adapted for generating voltage corresponding to frequency outputted from the soft starter 1, and serves to conduct a control so that the ratio between voltage and frequency delivered to the motor is fixed. At the time of starting of the motor, the motor is operated by the above-mentioned operation. When output of the soft starter 1 reaches the command frequency f, the changeover switch $S_1$ is switched to "closed". At subsequent times, operation is continued by the control method of this invention.

Effective power delivered to motor 14 is detected from voltage $[V_1]$ and current $[I_1]$ is delivered to motor 14 by the power detector 3. This effective power is introduced to the two filters 4 and 5. Filter 4 has short time constant $T_1$, and filter 5 has long time constant $T_2$. Moreover, changeover switches $S_2$, $S_3$ are in "open" state in the beginning. When change of power is less than set value $\Delta P_1$, the changeover switch $S_2$ is brought into closed state. Thus, filter 5 of long time constant is used for detecting effective power.

When change of power further becomes smaller and becomes less than value $\Delta P_2$ ($\Delta P_2 < \Delta P_1$), the changeover switch $S_3$ is brought into "closed" state. Thus, power is fixed to that at the time point when change of power is below $\Delta P_2$ as detected power $P_1$, and that power is stored into memory circuit 16. The power thus stored continues to be outputted.

The frequency f-to-coefficient $K_1$ converter 6 calculates constant (coefficient) $K_1$ with respect to frequency command f. Calculator 7 calculates, from coefficient $K_1$ calculated at converter 6 and detected power $P_1$, a voltage where efficiency of motor 14 becomes maximum. Limiter 8 is provided for prevention of over-excitation or prevention of stalling when speed is too low. The voltage Vo and the frequency command f which have been calculated in this way are delivered to driver 9. Thus, driver 9 controls transistors of inverter 10 so that line voltage $V_L$ and frequency command f are delivered to motor 14.

As stated above, since the motor is driven by supply (line) voltage corresponding to effective power/frequency command of the motor constantly in this circumstance, the motor is quickly operated at the maximum efficiency at all times as explained in detail in the above-mentioned framing of theory.

Industrial Applicability

As is clear from the foregoing description, in accordance with this invention, there is provided the excellent advantage that optimum voltage is delivered at a high speed to the motor in correspondence with load state so that the motor can be operated at the maximum efficiency at all times.

What is claimed is:

1. A control unit for a motor for controlling motor operation by an inverter, said control unit comprising:

a means for detecting an effective power delivered to said motor;

a calculation means for calculating a supply voltage, based on said detected effective power and a supply voltage frequency delivered to said motor, at which said motor will operate at maximum efficiency;

said calculated supply voltage being a product of a coefficient $K_2$, a square root of said detected effective power delivered to said motor, and $(f/f_0)^{1/3}$ where f is said supply voltage frequency $f_0$ is a specific supply voltage frequency;

a means for delivering said calculated supply voltage to said motor;

said coefficient $K_2$ being expressed as:

$$K_2 = K_{ro}/(f_0)^{1/3}$$

where $f_0$ = a specific frequency, and
$K_{ro}$ = a value of a coefficient $K_1$ when the frequency is $f_0$; and said coefficient $K_1$ being expressed as:

$$K_1 = [\{r_1^2(s(\eta_{max}))^2 + 2r_1r_2(r_1g_m+1) \times$$
$$s(\eta_{max}) + r_2^2(r_1^2b_m^2+1) + 2r_2^2(r_1g_m +$$
$$x_1b_m)\}/\{r_1(s(\eta_{max}))^2 + r_2(2r_1g_m+1) \times$$
$$s(\eta_{max}) + r_2^2(g_m + r_1b_m^2)\}]^{1/2}$$

where f = said supply voltage frequency for said motor,
$r_1$ = a primary resistance of said motor,
$r_2$ = a secondary resistance of said motor converted to the primary side of said motor,
$L_1$ = a primary leakage inductance of said motor,
$x_1$ = a primary leakage reactance of said motor = $2 \times \pi \times L_1 \times f$,
$r_m$ = an iron loss resistance of said motor,
$L_m$ = an excitation inductance of said motor,
$x_m$ = an excitation reactance of said motor = $2 \times \pi \times L_m \times f$,
$b_m$ = an excitation susceptance of said motor = $x_m/(r_m^2 + x_m^2)$,
$g_m$ = an excitation conductance of said motor = $r_m/(r_m^2 + x_m^2)$,
$s(\eta_{max})$ = an optimum slip of said motor when said supply voltage frequency is f, $$s(\eta_{max}) = [-B + \{B \times (A + B + 1)\}^{1/2}]/(A+1),$$
$$A = \{r_2(2r_1g_m + 1)\}/r_1, \text{ and}$$
$$B = \{r_2^2(g_m + r_1b_m^2)\}/r_1.$$

2. A control unit for a motor for controlling motor operation by an inverter, said control unit comprising:

a means for detecting an effective power delivered to said motor;

a calculation means for calculating a supply voltage, based on said detected effective power and a supply voltage frequency delivered to said motor, at which said motor will operate at maximum efficiency;

a means for delivering said calculated supply voltage to said motor;

said effective power detecting means including a first power detection filter and a second power detection filter;

said first power detection filter having a smaller time constant than said second power detection filter; and said effective power detecting means comparing a change in detected effective power to a first constant $\Delta P_1$ such that when said change in detected effective power is equal to or greater than said first constant $\Delta P_1$ said effective power detecting means uses said first power detection filter to detect effective power, and when said change in detected effective power is less than said first constant $\Delta P_1$ said effective power detecting means uses said second power detection filter to detect effective power.

3. A control unit for a motor as in claim 2, wherein:

said effective power detecting means compares said change in detected effective power to a second constant $\Delta P_2$ which is less than said first constant $\Delta P_1$ such that when said change in detected effective power is less than $\Delta P_2$ a value for effective power is fixed and continuously outputted to said calculation means as the detected effective power until a change of effective power greater than $\Delta P_2$ is detected.

* * * * *